Aug. 28, 1956

S. E. BENGTSON 2,760,226

SAUSAGE CASING END TYING MACHINE

Filed Feb. 20, 1953

INVENTOR
SVEN EMANUEL BENGTSON,
by John B. Brady
ATTORNEY

Aug. 28, 1956 S. E. BENGTSON 2,760,226
SAUSAGE CASING END TYING MACHINE
Filed Feb. 20, 1953. 8 Sheets-Sheet 2

INVENTOR
SVEN EMANUEL BENGTSON,
by John B. Brody
ATTORNEY

Aug. 28, 1956 S. E. BENGTSON 2,760,226
SAUSAGE CASING END TYING MACHINE
Filed Feb. 20, 1953 8 Sheets-Sheet 3

INVENTOR
SVEN EMANUEL BENGTSON,
By John B. Brady
ATTORNEY

Aug. 28, 1956 S. E. BENGTSON 2,760,226
SAUSAGE CASING END TYING MACHINE
Filed Feb. 20, 1953 8 Sheets-Sheet 4

INVENTOR
SVEN EMANUEL BENGTSON,
By John B. Brady
ATTORNEY

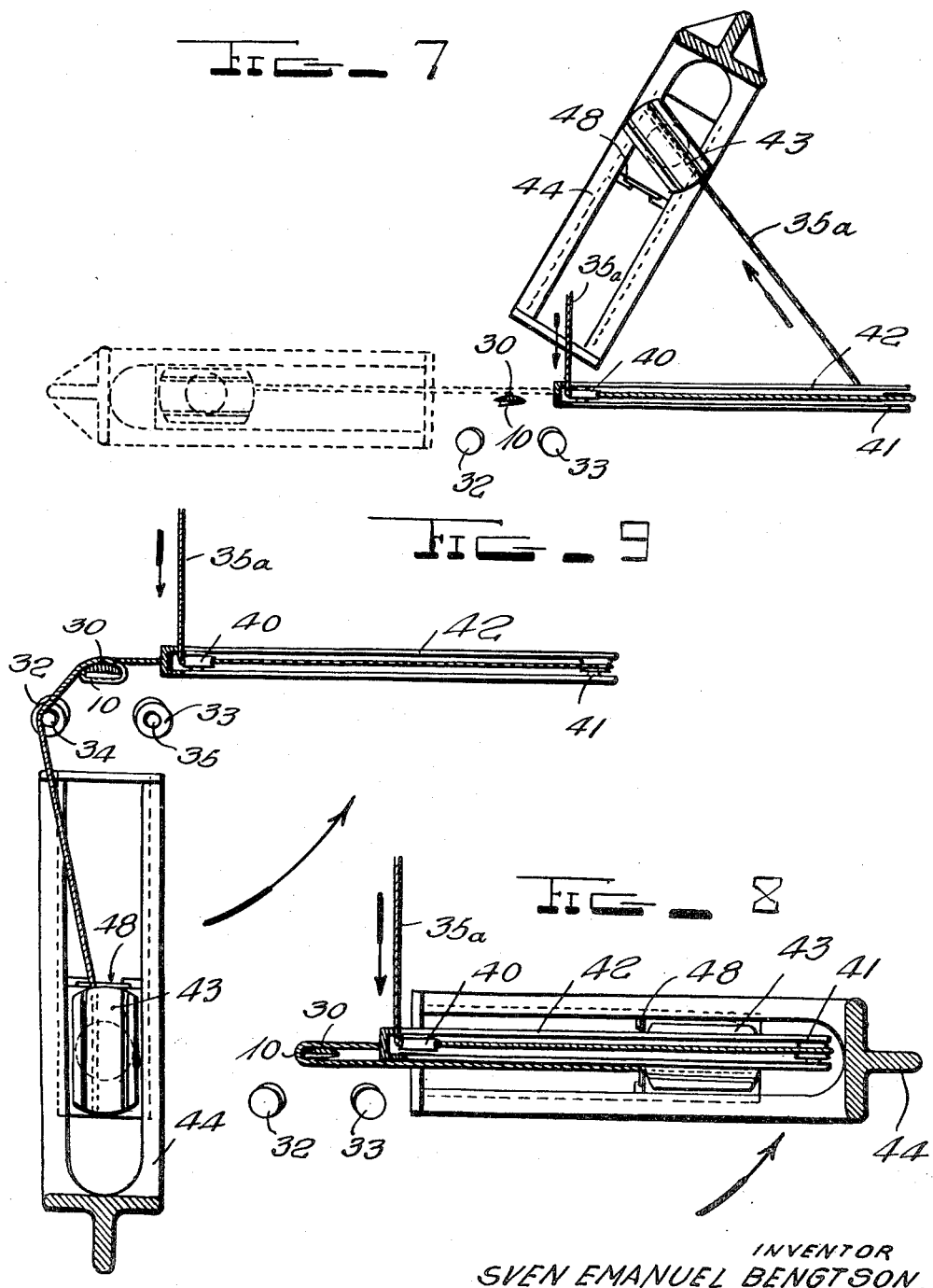

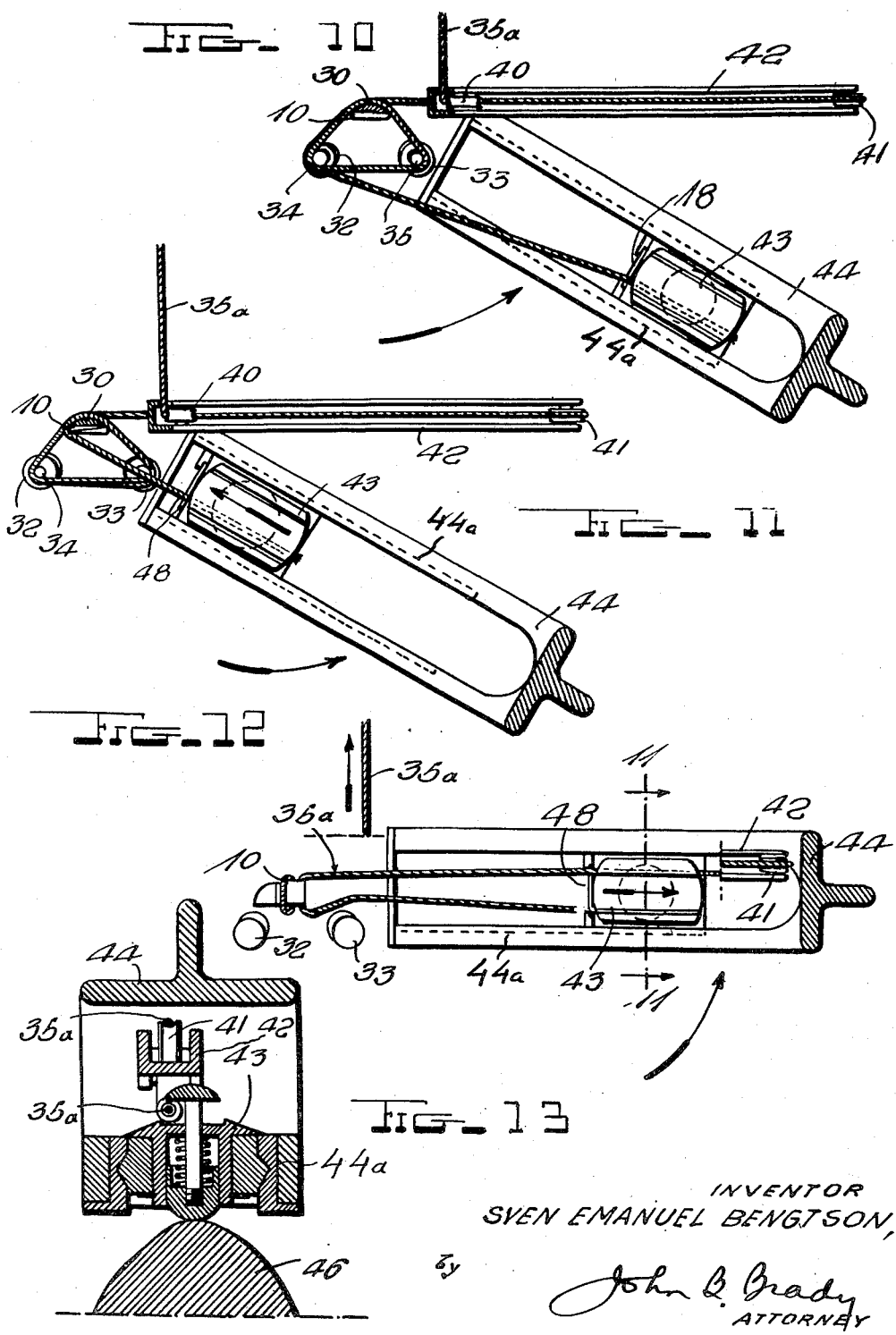

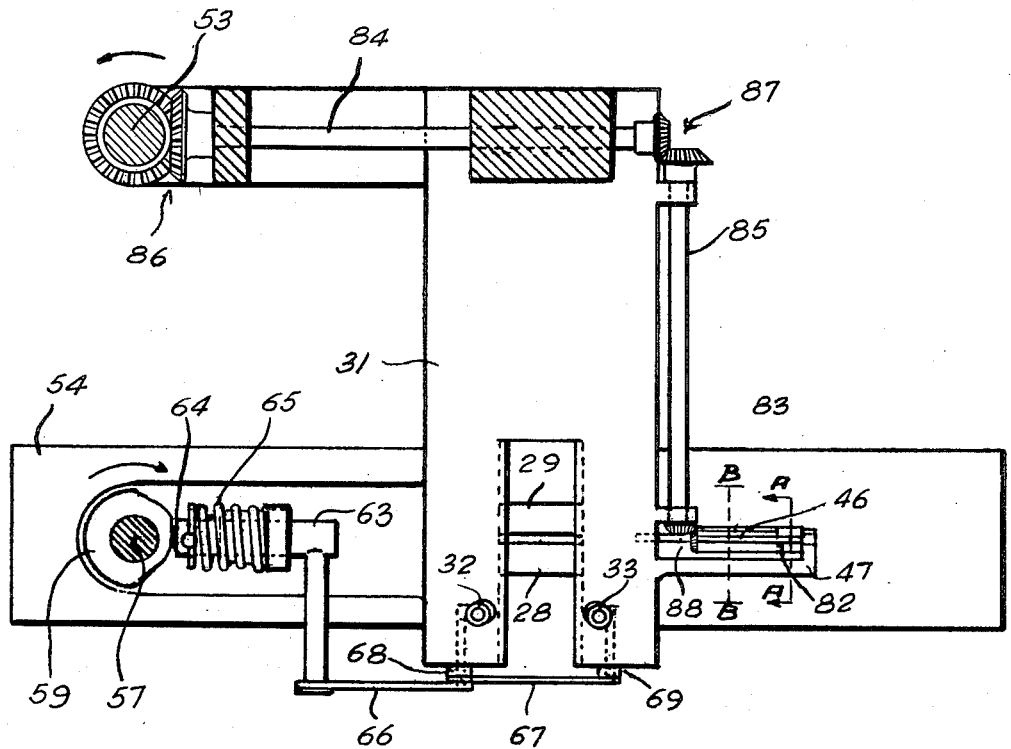

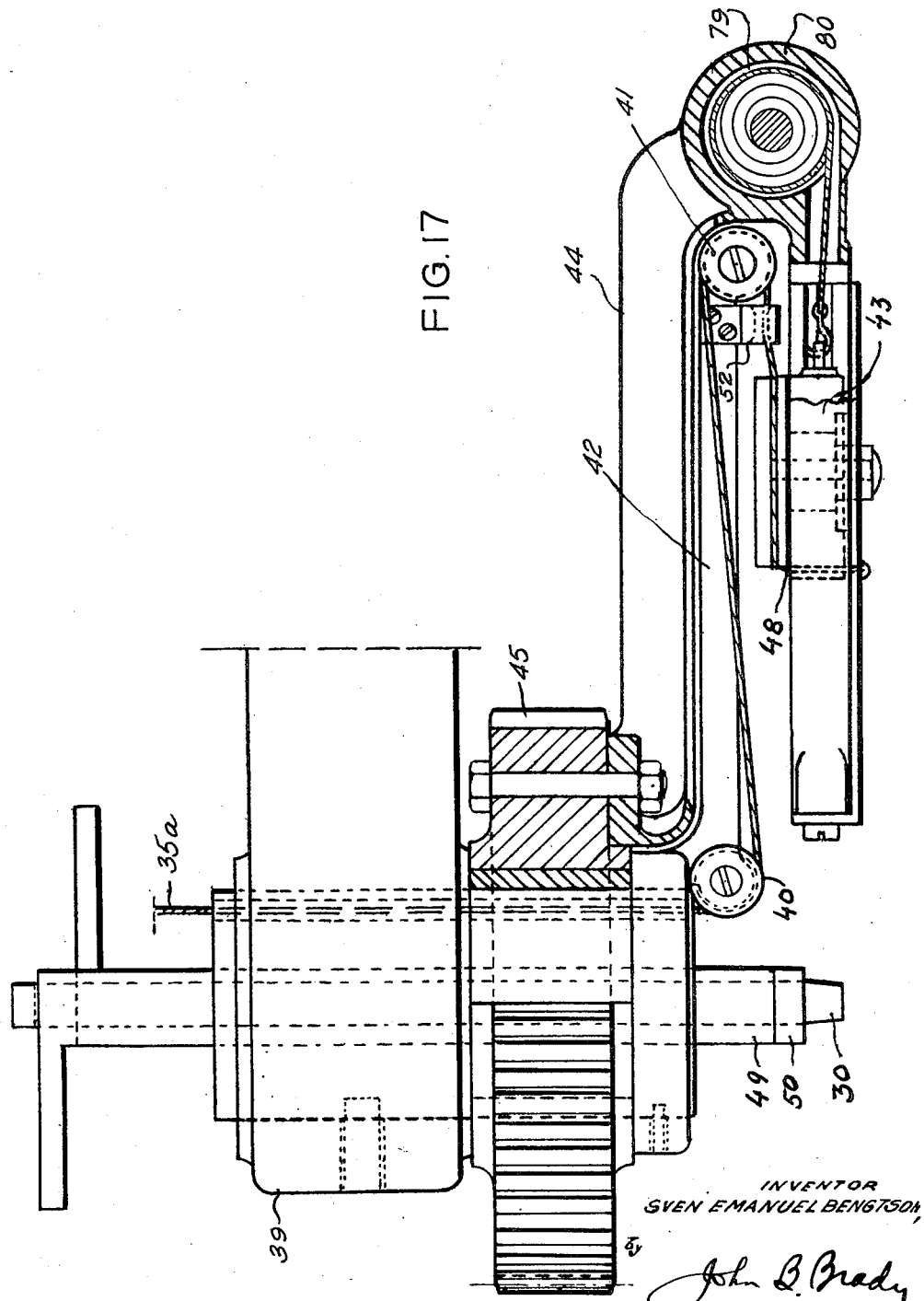

United States Patent Office 2,760,226
Patented Aug. 28, 1956

2,760,226

SAUSAGE CASING END TYING MACHINE

Sven Emanuel Bengtson, Lidingo, Sweden

Application February 20, 1953, Serial No. 338,087

Claims priority, application Sweden July 16, 1947

16 Claims. (Cl. 17—34)

This invention relates broadly to the manufacture of sausage and more particularly to the construction of a machine for closing one end of sausage casings or similar articles of manufacture.

This application is a continuation-in-part of my application Serial Number 38,316, filed July 12, 1948, for Machine for Closing One End of Sausage Casings or Similar Articles of Manufacture.

It is the current practice in sausage plants to use synthetic sausage casings to an ever greater extent which are produced out of cellulose derivatives or other substances in the shape of thin-walled tubes, which are then cut off to the desired lengths and which before the stuffing operation are closed at one end. The end is closed by folding it over after it has been creased together, whereupon a cord is tied around in a special way so that it makes a secure seal. Heretofore this work has been done manually and at a price that in relation to the manufacturing cost as a whole is abnormally high. It is therefore desirable to completely mechanize this procedure in order to reduce this cost.

The object of this invention is to provide an automatic machine that rapidly performs the cutting to size of the sausage casings and the secure tying of one of its ends as well as counting of the number of casings thus treated. The characteristic features of the invention will appear from the following brief description with reference to the accompanying drawings, which show the main features of the invention.

In the drawings:

Figs. 7, 8, 9, 10, 11 and 12 illustrate successive positions of the tying mechanisms in effecting the tying of the sausage casings.

Fig. 13 is a cross sectional view of the release mechanism for restoring the tying mechanism to its starting position after completion of the sausage tying operation.

Fig. 14 is a cross sectional view, partly broken away, of the machine and taken along the lines D—D in Fig. 1.

Fig. 15 is an enlarged cross section taken along the line A—A in Fig. 14.

Figure 1:
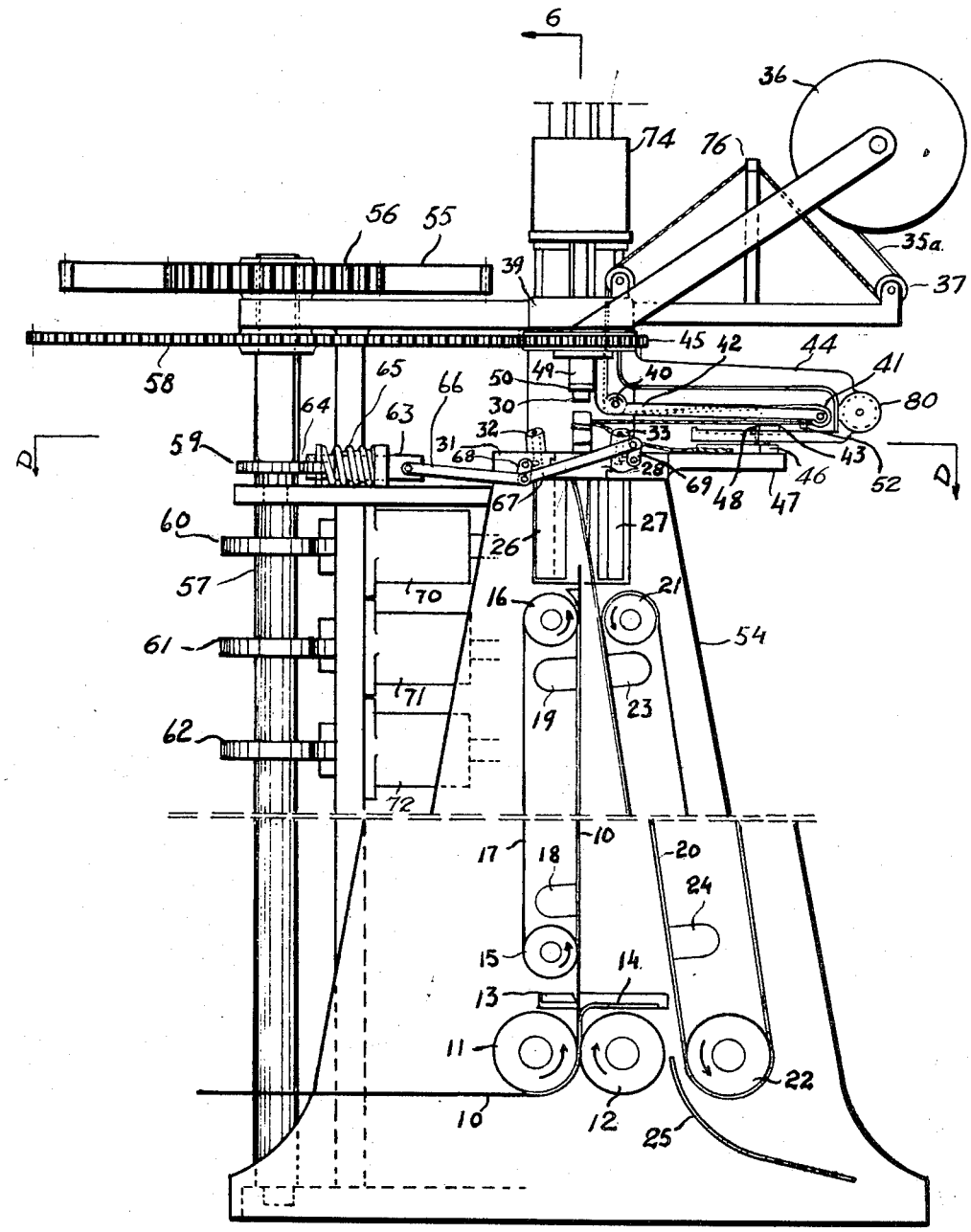
Fig. 1 is a side elevational view of the machine, the middle section being cut away to save space and certain hydraulic conections being omitted for clarity.

Fig. 16, to the same scale, shows a similar section taken along the line B—B in Fig. 14, and Fig. 17 is an enlarged elevation, partly in vertical section and partly broken away and the tying and cord cutting mechanism and associated parts of the machine.

Like reference characters denote corresponding parts of the machine in all figures.

As will appear from Fig. 1, the sausage casing, being supplied in relatively long lengths, is introduced into the machine as a strip 10, pressed flat, which with some suitable speed is fed between two rollers, 11, 12. Above these rollers there is a pair of shears for cutting off of the sausage casings; said shears are made up of a blade 13, which by suitable means not shown is moved in a horizontal plane, and a rigidly mounted blade 14. After having passed between these blades 13, 14 the sausage casing moves upwardly in contact with an endless belt 17 made of wire gauze or similar material, which is stretched around belt pulleys 15, 16 which are rotated at a suitable speed by suitable means (not shown). In order to force the sausage casing upwardly along with the belt 17, there are provided a number of suction cups engaging the upwardly moving portion of the belt, and of which two are indicated in Fig. 1 by the reference characters 18, 19. A similar arrangement—comprising an endless belt 20, belt pulleys 21 and 22, a number of suction cups of which two are indicated by reference characters 23 and 24, and a discharge channel 25—is provided for the discharge of the ready-tied sausage-casings.

Figure 2:
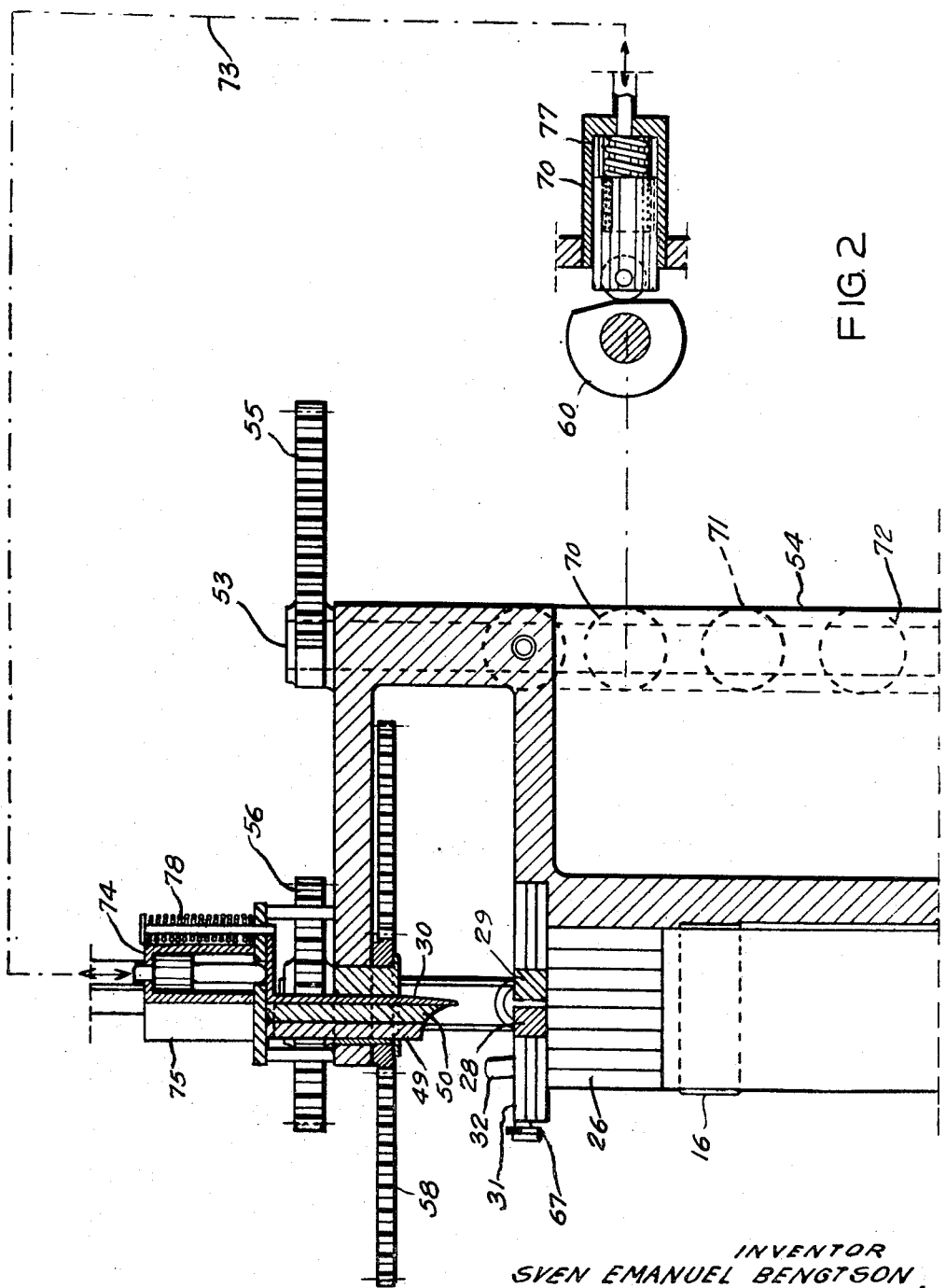
Fig. 2 is a correspoding vertical sectional view taken along lines C—C in Fig. 1.
Figure 3:
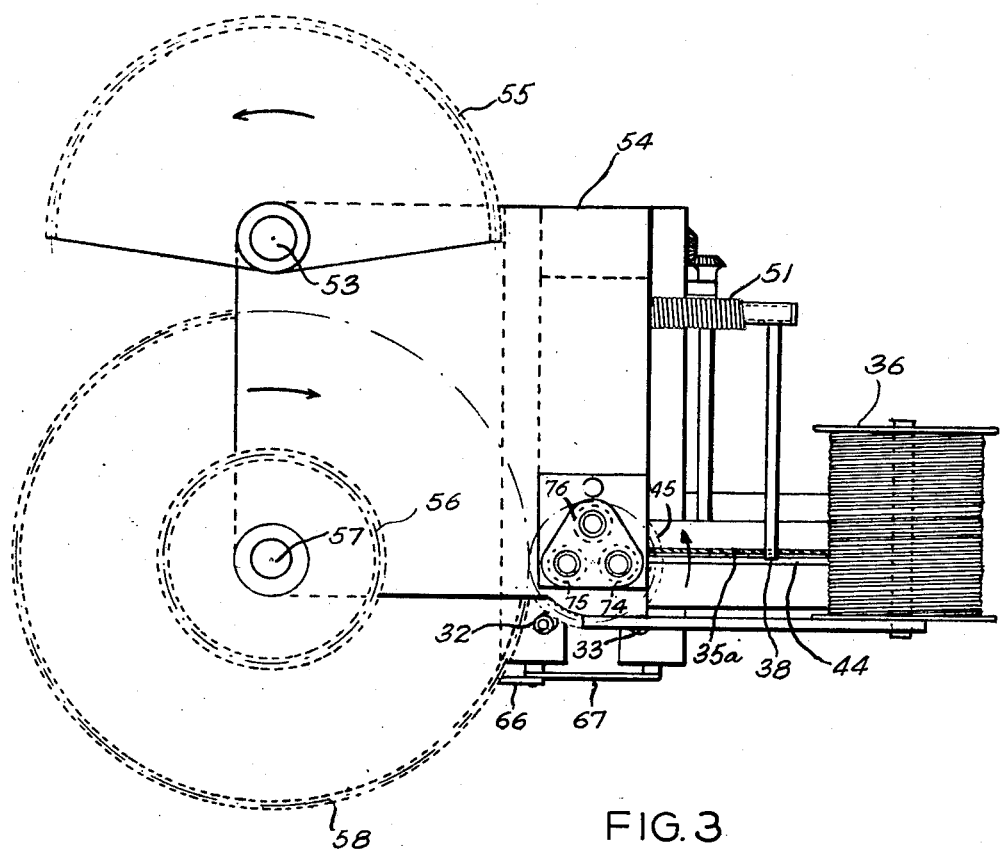
Fig. 3 is a fractional plan view of the machine.
Figure 4:
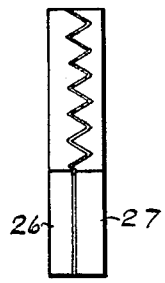
Fig. 4 is an enlarged plan view of a part incorporated in the machine.

Above the parts just described there are provided two blocks 26 and 27 horizontally movable to and from each other and formed in their opposite end surfaces with V-shaped, generally vertical grooves and ridges so arranged that when the blocks 26, 27 are pressed together the ridges of one block engage the grooves in the other one, as appears by reference to Fig. 4 being a top plan view of the blocks 26, 27. On top of these blocks there is another pair of blocks, which also are horizontally movable towards each other, and of which one, 28, is shown in Fig. 1. Both blocks, 28 and 29, are shown in Figs. 2 and 3. These blocks 28, 29 have no serrations, are shorter in height than the blocks 26, 27 and are movable to and from each other in a horizontal plane edgewise of the sausage casing. Thus the planes of movement of the pairs of blocks 26, 27, and 28, 29 are both horizontal, however, the paths of movement being perpendicular with respect to each other. The blocks 26, 27 serve to produce folding lines in the upper end portion of the sausage casing, and the blocks 28, 29 press this portion of the casing together along the vertical folding lines and hold it securely while the cord is wound around and while the top end of the casing is folded over and tied up with the underlying compressed part of the casing, as will be described in the following description.

The following are the means for these folding over and tying operations which will be made clear by reference to the successive operational steps illustrated in Figs. 1, 2, 3, 7 to 12, 14, 17:

A supporting member 30, formed in the shape of a chisel, is movably mounted so that it can be pushed down from the upper part of the frame towards a table 31. On the table 31 there are two upwardly projecting sleeves, 32 and 33. In each sleeve there is guided an axially movable pin, 34 and 35, respectively, (Fig. 3), which at certain moments of the tying procedure can be caused (in a manner to be described further below) to protrude out of the surrounding sleeve but for the rest of the time is withdrawn in it. A tying cord 35a is wound on a reel 36 mounted on the machine frame. Its free end is first passed through a friction or brake means 37, then through an eye at the end of a rockable tensioning arm 38 preloaded by a torsion spring 51, then through a hole in the hub 39 of a gear 45, and around pulleys 40 and 41, which are mounted on an arm 42, the inner end of which is attached to said hub 39; then the cord is passed through a guide ring 52 (Fig. 1) and is grasped by a clamp 43.

The clamp 43 is, by means of a bolt, rotatably mounted in a sleeve which runs in a guide on a bent-over arm 44. The arm 44 is at its inner end attached to the underside of a horizontally disposed gear 45 which can rotate around the stationary hub 39. The clamp 43 is actuated by a cam member 46 that is rotatably mounted on an arm 47 rigidly secured to the frame. Immediately to the left of the clamp 43 (as referred to the drawing) there is a knife device 48 for cutting off of the cord when the winding procedure is finished. The knife device is also actuated by the cam member 46. In the centre of the hub 39 there is, besides the supporting member 30, provided a vertically reciprocable folding device; this consists of two members, of which the left one, 49 (Fig. 1), can be lowered beyond the right one, 50, when the latter has come to a stop, whereby the top end portion of the sausage casing will be folded over (see Fig. 6). The machine is associated with a source of power (not shown) and a timing device known per se (not shown) that may be placed in rear of the machine, and by means of which the moving parts of the machine are caused to perform their various functions in the correct sequence and at the proper instants.

Referring to Figs. 1, 2, 3, 14 and 17 of the drawings, the operating means of the machine comprises the following parts: A continuously rotating shaft 53 is vertically mounted in the machine frame 54 and carries at its top end a gear segment 55. The shaft 53 is, in a manner not specifically shown, adapted to be driven from any suitable power source, and the gear segment 55 cooperates intermittently with a spur gear 56 mounted on the top end of a vertical cam axle 57 journalled in the frame 54 so as to rotate this axle when the segment 55 engages the spur gear 56.

The cam axle also has keyed thereto at its upper end portion a second spur gear 58 which operatively engages the previously mentioned gear 45 to which the bent-over arm 44 is attached so as to extend therefrom in a radial direction.

The cam axle 57 has further attached to it intermediate its ends a plurality of cam members four of which are illustrated in Fig. 1 and designated with numerals 59, 60, 61 and 62. The uppermost cam member 59 cooperates with a linkage comprising a horizontally reciprocable slide member 63 which is provided with a cam follower 64 and urged into engagement with the cam 59 by a coil spring 65. The slide 63 has pivoted to it a rod or link 66 which has pivoted to its remote end a second rod or link 67. Each link 66 and 67 has pivoted to its end remote from the cam a bell crank 68 and 69, respectively, rockably mounted on the lateral edge of the table 31 and engaging with their free ends the pins 34 and 35, respectively, movable in the sleeves 32 and 33 projecting from said table. As will be seen, said pins will be projected into an operative position and retracted in response to the intermittent rotation of cam axle 57.

Cam members 60, 61 and 62 are adapted to operate plungers, respectively, of three fluid cylinders or pumps 70, 71 and 72 serving to operate, through fluid conduits and connections not specifically in Fig. 1, corresponding fluid cylinders having plungers operating various movable devices and members of the machine. Thus for instance, as diagrammatically indicated in Fig. 2, cam 60 operates fluid cylinder 70 as illustrated in the horizontal cross-sectional view to the right in Fig. 1, and this cylinder 70, through the conduit indicated by the broken line 73, operates a fluid cylinder 74 disposed on top of the machine and in its turn operating the chisel-shaped supporting member 30 in the timed relation determined by the cam 60 and the intermittent rotation of axle 57. In a similar manner, fluid cylinders or pumps 71, 72 driven by cams 61 and 62 operate two further fluid cylinders 75 and 76, respectively, also disposed on top of the machine and adapted to operate the sausage case top folding members 49 and 50, respectively.

Further such cams and fluid pressure operated devices (not shown) may be provided for reciprocating the movable blocks 26, 27 and 28, 29 in a manner similar to that just described. The reciprocable members may rely for their restoration into neutral on spring means such as at 77 and 78 in Fig. 1.

The mode of operation of the machine is substantially as follows:

The sausage casing is continuously fed into the machine between the rollers 11, 12, and travels upward along the belt 17, since, by means of the suction cups, 18, 19, etc. It adheres to the belt. The sausage casing continues upward between the blocks 26, 27.

When it has reached their upper edges, the blocks 26, 27 are quickly clasped about the casing and impress the folding lines in it, so that the end portion of the sausage casing in cross-section forms a zig-zag line. When this is done the clamping blocks release the casing, which continues upward between the clamping blocks 28, 29. When the end of the sausage casing has reached a proper level above these clamping blocks 28, 29, they crease the casing together along the folding lines just impressed in the same and hold it for the subsequent operations. At the same time the casing is cut to size by the pair of shears 13, 14 and is moved over to the opposite belt assembly 20 to 24, that at the moment is at rest, which movement is accomplished by the belt assembly 15 to 19 being rockable in a vertical plane. At the moment of contact between the belt assemblies the suction of the cups 18, 19 . . . is caused to discontinue and the suction of the cups 23, 24 . . . is started. The sized sausage casing therefore leaves the belt assembly 15 to 19, which immediately is caused to rock back to the position shown in Fig. 1, whereupon the casing is held by the belt assembly 20 to 24. In this way space is made available for fresh feeding of the web of sausage casing upward along the assembly 15 to 19.

Immediately following the clamping of the end portion of the sausage casing between the clamping blocks 28, 29 the supporting member 30 is pushed down thereby serving as a support for the protruding piece of casing while the cord is being wound about it. The cord end is held by the clamp 43, which is pivoted on the U-shaped arm 44, that is attached to the gear 45. Clamp 43 is longitudinally slidable in guides 44a formed in arm 44 as shown more clearly in Fig. 13. When now the gear 45 is caused to rotate about the hub 39, the cord 35a is wound around the protruding end portion of the casing above the clamping plates 28, 29. By means of the gearing and timing devices previously described or indicated the gear 45 with its arm 44 is made to rotate four revolutions about the hub 39 for each tying operation. The rotation is thought to occur in a counterclockwise direction as seen from above and is enabled by the expedient that the frame 54 is formed with a bend leaving a space 79 for the rotating arm 44.

Figure 5:
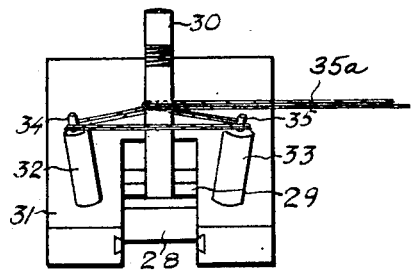
Fig. 5 illustrates one operational stage in the wrapping around of a cord for tying the sausage casing end.
Figure 6:
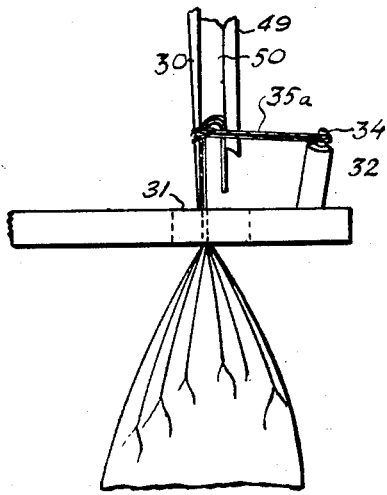
Fig. 6 shows one stage in the folding over of the end portion of the sausage casing immediately before the cord is pulled tight.

During the first revolution the cord is wound around the sausage casing and the supporting member 30 only. At the beginning of the second revolution the pins 34, 35 are caused to rise and protrude out of the sleeves 32, 33 to such a length that, during the second and third revolutions, the cord will be wound around the sausage casing and the pins 34, 35. At the beginning of the fourth revolution the pins 34, 35 are retracted enough for the cord not to be wound around the pins during the fourth revolution, but only so much that they do not release the second and third turns of the cord just previously wound (see Figs. 5 and 6). After completion of the fourth revolution, the pins 34, 35 are completely withdrawn into their respective sleeves, whereby they release the cord, so that it may be tightened around the sausage casing, the end piece of which has just been folded over as shown in Fig. 6.

The tightening of the cord is accomplished in the following manner:

When the winding operation starts the arm 38 is rocked downward against the upwardly directed action of the torsion spring 51 as the cord is retarded by the friction brake device 37. At the end of the winding operation the frictional resistance between the cord on one hand, and the sausage casing and the pins 34, 35 on the other hand is of such magnitude that the cord cannot slide. The clamp 43 operates against the tension of a spiral spring 79 (Fig. 17) fitted in a housing 80 on the arm 44. Therefore, as the pins 34, 35 release the cord, this is tightened by the spring force acting on the clamp 43 and the arm 38. By proper dimensioning the tightening can be made to the correct degree. Prior to the tightening the supporting member 30 and the folding members 49, 50 have been retracted so that the tightening will occur about the sausage casing only.

Finally the clamp 43 is caused to release the free end of the cord after the cord has been cut off by the knife 48 moved upward by action of the rotating cam 46, as shown in Figs. 13 to 16, whereupon the clamp is moved back to the starting position by its return spring 79 and grasps the other part of the cord in response to the action of the cam 46 so that the ready-tied sausage casing after separation of the clamping blocks 28, 29 is released and may be discharged by means of the belt assembly 20 to 24 and the discharge channel 25.

For the purposes stated, the cam member 46, as specifically illustrated in Figs. 14 to 16, consists of a bar shaped into the desired cam contour and journalled longitudinally of the arm 47 of the frame 54. The cam has two cam ridges 82, 83 in angularly spaced relation and serving for operating the knife 48 and clamp 43, respectively, in the properly timed relation. As will clearly appear from Fig. 14, the cam member 46 is rotated from the shaft 53 through intermediate transmission shafts 84, 85 and conical pinions and gears 86, 87, 88.

Evidently modifications of the construction described may be made without departing from the principle of the invention, e. g. the casing cutting operation may be eliminated by introducing ready-cut sausage casings into the machine. Such modifications are also deemed to be within the scope of the claimed invention.

It is obvious that, by variation of transmission ratios and the like and by the positioning of the blades 13, 14 of the pair of shears, the machine can be adapted to various length sizes of casings. The machine could also be combined with means for automatically counting the sausage casings handled thereby.

What I claim and desire to secure by Letters Patent of the United States is as follows:

1. A sausage casing tying machine comprising a main frame, a casing tying station in said frame, power driven means mounted on said frame for feeding casings one at a time to said tying station and for discharging the casings therefrom after the tying operation, power operated means mounted on said frame in advance of said tying station for imparting longitudinal folding lines to the leading end portion of each casing, power operated members disposed on said frame between said power operated means and said tying station for crimping said casing and holding said leading end portion of the casing during the tying operation, cord supplying means supported on the frame, a power driven revolving member journalled in said frame adjacent said tying station, cord guiding means disposed between said cord supplying means and said revolving member, releasable clamping means disposed on said revolving member for receiving and clamping the free end of a cord supplied from said cord supplying means while said cord end is carried by said revolving member in a circular path around said tying station and tied about a crimped casing end, a power driven set of coacting pins slidably mounted in said frame in laterally spaced relation to said power operated members at said tying station and extensible into and retractable from the path of said cord when moved about the casing end, the power drive of said set of pins being timed in such a manner that, during the movement of said clamping means the cord will encircle said casing end in a relatively narrow loop, and during further movement thereof in a wider loop, and during the final movement of clamping means again in a narrow loop, said power operated means being timed with the operation of said set of pins for endwise folding over the extreme end portion of said crimped casing and so as to cause the same to enter the space between said narrow loops and said wide loop or loops, and means for timing the operation of said set of pins with said power operated means, for stripping the wider loop from said set of pins by retracting said pins, and means controlled by said power operated means and cooperating with said clamping means for imparting pull forces to said cord and for tightening said wider loop about the crimped and folded end of said casing so as to form a binding-in knot.

2. A sausage casing tying machine as set forth in claim 1, in which said revolving member includes an arm perpendicular to and rotatable about an axis substantially coincident with the longitudinal axis of the crimped sausage casing when held at said tying station, and in which said clamping means for the cord is supported by said arm.

3. A sausage casing tying machine as set forth in claim 1, in which said revolving member includes an arm perpendicular to and rotatable about an axis substantially coincident with the longitudinal axis of the crimped sausage casing when held at said tying station, and wherein the clamping means for the cord is longitudinally slidably supported on said arm and is spring biased towards an outer limit position thereon.

4. A sausage casing tying machine as set forth in claim 1, in which said guiding means for said cord is aligned with a guide for said clamping means in order that, after the clamping means has performed a first half revolution, the pulled part of the cord is directed in parallel with said guide from said guiding means to the crimped end of the sausage casing.

5. A sausage casing tying machine as set forth in claim 1, which includes a supply reel mounted on said frame for carrying said cord and wherein the cord is passed from said reel to said guiding means, and a frictional brake engaging the cord in an intermediate position, said brake being maintained active during the loop winding operation.

6. A sausage casing tying machine as set forth in claim 1, which includes a supply reel for the cord and wherein the cord is passed from the supply reel to said guiding means, a spring biased arm constituting a tensioning device mounted on said frame and engaging said cord and being adapted upon disengagement of said wide loops to pull the cord back causing the knot to be tightened around the crimped and folded-over end of the sausage casing.

7. A sausage casing tying machine as set forth in claim 1 in which said clamping means is rotatable about an axis perpendicular to said guiding means.

8. A sausage casing tying machine as set forth in claim 1 in which said revolving member includes an arm perpendicular to and rotatable about an axis substantially coincident with the longitudinal axis of the crimped sausage casing when held at said tying station, and wherein the clamping means for the cord is longitudinally slidably supported on said arm and is spring biased toward an outer limiting position thereon and in which the clamping means is automatically disengaged from the end of the cord after accomplishing the tying of the crimped end of the sausage casing, after which the clamping means is returned by said spring to said outer limit position for catching a new part of the cord, and wherein a knife device is arranged to cut off the cord in advance of the clamp in its retracted position.

9. A sausage casing tying machine as set forth in claim 1 in which each one of the coacting pins is movablae in a sleeve and so arranged that when inactive the pin is withdrawn into the sleeve and when active the pin protrudes from the sleeve.

10. A sausage casing tying machine as set forth in claim 1 in which each one of the coacting pins is movable in a sleeve and so arranged that when inactive the pin is withdrawn into the sleeve and when active the pin protrudes from the sleeve, and in which one of said coacting pins in shaped as a supporting member, which, while the cord is being applied, assumes a position parallel with and close to the crimped end of the sausage casing that projects from said holding means.

11. A sausage casing tying machine as set forth in claim 1, in which said power operated means for imparting folding lines to the leading end portion of each casing includes means located between the cord loops consisting of two sliding members movable in relation to each other and in relation to a supporting member, and of which sliding members, that one situated remote from said supporting member is so arranged that in the last portion of the folding operation it will be projected beyond the operating end of the slide situated next to the supporting member.

12. A sausage casing tying machine as set forth in claim 1, in which said power operated means for imparting folding lines to the leading end portion of each sausage casing comprises a set of plates provided with mating depressions and ridges that press together the part of the upper end of the sausage casing.

13. A sausage casing tying machine as set forth in claim 1, in which said power operated means for crimping and holding the end portion of the casing comprises a set of plates operable to crease the sausage casing after the operation of imparting said folding lines thereto.

14. A sausage casing tying machine as set forth in claim 1, in which said holding means is associated with said feeding means for automatically conveying the sausage casing to the tying station, said feeding means being operable to feed a relatively long sausage casing length, and including a pair of shears operable to cut said sausage casing length into individual casings.

15. A sausage casing tying machine as set forth in claim 1, which includes casing feed rollers mounted in said frame and a perforated endless belt passing over said rollers for feeding the sausage casing to the tying station, suction means associated with said belt for maintaining the sausage casing on the endless belt on its path to the tying station, and in which said holding means consists of a set of plates adjacent one end of said endless belt conveyor for holding the crimped end of the sausage casing, and shears interposed between said feed rollers and said perforated endless belt for cutting said sausage casing into predetermined lengths.

16. A sausage casing tying machine as set forth in claim 1, which includes means disposed on said frame for automatically ejecting the completely tied sausage casings and comprising an endless belt and suction means arranged adjacent said belt for receiving the tied sausage casings.

References Cited in the file of this patent
UNITED STATES PATENTS
2,462,957    Gunn  ---------------- Mar. 1, 1949